Dec. 19, 1967     J. R. EHRENFELD ET AL     3,358,452

VALVELESS ROCKET MOTOR USING SUBLIMING SOLIDS

Filed Oct. 21, 1965

INVENTORS
JOHN R. EHRENFELD
SIDNEY H. KRIMSKY
CHARLES L. ROSEN
BY
Kenway, Jenney & Hildreth
ATTORNEYS

United States Patent Office 3,358,452
Patented Dec. 19, 1967

3,358,452
VALVELESS ROCKET MOTOR USING SUBLIMING SOLIDS
John R. Ehrenfeld, South Acton, Sidney H. Krimsky, Cambridge, and Charles L. Rosen, North Reading, Mass., assignors to GCA Corporation, Bedford, Mass., a corporation of Delaware
Filed Oct. 21, 1965, Ser. No. 499,452
3 Claims. (Cl. 60—200)

ABSTRACT OF THE DISCLOSURE

This invention is a small propulsion device for use in space rocketry which is adaptable for miniaturization, comprising a container having a porous heater therein, the heater being located away from the exit orifice of the device in order to form therewith a gas chamber. Against the other side of the heater is constantly pressed a subliming propellant the contacting surface of which is heated by the heater uniformly in order to create a gas which penetrates the heater into the aforesaid chamber from which it exits via the exit port. By thus heating the propellant, plus the use of a constant volume pressure chamber, extremely accurate control over the subliming of the propellant is obtained and thus the orifice pressure.

---

This invention relates to propulsion devices, and in particular to rocket motors employing a solid propellant which is adapted to be sublimed when heated.

In the field of missiles and rockets, there is a growing need for propulsion devices which will have their primary use in situations where a combination of long life and a low thrust level is required. In addition, the characteristic of small size, light weight, elimination of valves, pressure regulators, pressurizing systems, etc. are highly desirable features which such a low thrust level propulsion device should have. Furthermore, it is desirable to have a propulsion device which can be cycled on and off, this cycling sometimes being called pulsing, without undue delay when the pulsing operation is commenced, and also undue delay when it is desired to end the pulsing operation. In view of the fact that as now contemplated rockets will be on journeys of long periods, it is also desirable to have course correcting or orientation devices which can be cycled on and off almost indefinitely. Power requirements for such devices should also be minimized, in order to avoid unnecessary weight.

Therefore, among the several objects and provisions of this invention may be noted the provision of a rocket motor based on the sublimation of a propellant by means of an energy source external to the propellant; the provision of a propulsion device of the class described which requires no valves to control the on-off cycles; the provision of a propulsion device of the last named class which is suited for application where low-thrusts are required; the provision of a propulsion device of the classes described which can operate in a cycling or continuous fashion for long periods of time in space; the provision of a subliming rocket motor in which the weight of the total device is at a minimum; the provision of a device of the last named kind in which no pumping components are needed; the provision of a subliming rocket motor in which an efficient heat transfer to the surface of the propellant is obtained, together with uniform sublimation and efficient overall utilization of the propellant; the provision of a subliming rocket motor which utilizes a solid propellant of a kind commonly available, and does not rely upon esoteric fuels; and finally the provision of a propulsion device which is simple in its construction, and relatively inexpensive to manufacture. Other objects will be in part obvious and in part pointed out hereinafter.

The device consists of a propellant grain, casing, a porous plate, a plenum chamber, heating means for the grain which in one embodiment is the porous plate itself and in a second embodiment is a combination of a porous plate and a separate heater, and an exit orifice. The casing encloses the propellant grain, the heating means, and the plenum chamber. The propellant grain, prepared in the form of a cylindrical pellet or other convenient shape, has one face pressed against the surface of the porous plate by means such as a spring or by a bellows-type expansion device. When the surface of the grain pressing against the plate is heated, for example by means of the passage of an electrical current through it, or by means of a radiant heater located adjacent that side of the porous plate away from the propellant, the surface of propellant grain in contact with the porous plate will sublime, and the products of sublimation will pass therethrough into the plenum chamber. The interior pressure due to the products of sublimation will build up, as the flow out of the case is constricted by the nozzle or orifice, until the rate of flow through the nozzle becomes the same as the rate of sublimation or evaporation at the propellant-heater interface. By suitably designing the nozzle in terms of expansion ratio and throat area, and by using a propellant grain and heater of proper size, thrust from micro-pounds to tenth-pounds or even larger levels can be achieved.

Information on subliming type propellant rocket motors is available, and reference is made to the article entitled, "Valveless Control Rockets Developed" which appeared in the magazine, "Missiles and Rockets," Sept. 28, 1964. It is the purpose of this invention to provide an improved subliming propellant propulsion device.

The invention accordingly comprises the elements and combination of elements, features of construction, and arrangement of parts which will be exemplified in the structures hereinafter described, and the scope of the application of which will be indicated in the following claims.

In the accompanying drawings, in which are illustrated two embodiments of the invention:

Throughout the drawings, similar reference characters illustrate corresponding parts of the embodiments. The various drawings in some instances may have been exaggerated as to relative thickness of parts or as to size, in order to show detail with greater clarity.

Figure 1:
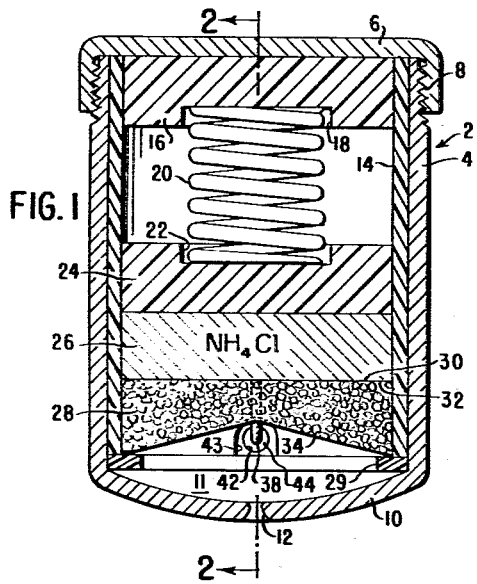
FIG. 1 is an elevation in section of one embodiment of the invention.

Turning now to FIG. 1 for a further description of the invention, a rocket motor of this invention is shown generally by numeral 2, and comprises a casing 4 which in this instance is shown as cylindrical. (Other cross-sectional shapes, such as polygonal, for casing 4 can be used if desired.) Casing 4 may be made of a light weight metal such as aluminum, or, if desired, may be made of steel. Casing 4 can also be made of a molded synthetic resin which is capable of withstanding the temperatures developed within the casing by the heater thereof.

Casing 4 has a closure means at one end, in this instance shown by the cap 6 which is shown as being screwed onto the end of the casing by a suitable threaded means 8. Of course, if desired, flanges on the casing 4 and the cap 6 could be provided, so that after the parts are assembled within the casing, then these flanges can be joined by conventional means to provide the closure. Also, while the cap 6 has been shown at one end of the casing 4, it could equally well be put at the other end of the casing, in which construction it is preferably domed as will now be described for said other end.

The other end of the casing is also closed by means of the closure means 10, the end 10 being in this instance integrally formed as part of the casing 4. The end 10 is shown as being domed in order to assist in forming a plenum chamber 11, but it is obvious that a domed end is not per se necessary if the parts are so spaced as to provide the proper plenum chamber for the intended use. A venturi orifice 12 is provided in the end 10, but this orifice can be of such other shape as is required for the specific purpose of the propulsion device 2.

Within the casing 4, there is provided an electrical and thermal insulating member 14 which may be of a synthetic resin material such as Teflon, the layer 14 lying close to the interior wall of casing 4. At one end of the casing, there is provided a plate 16 which also may be of plastic such as Teflon. Plate 16 is milled out or molded to provide the recess 18 which forms a seat for the compression spring 20. The other end of spring 20 seats in a recess 22 which is provided in a similar pressure plate 24, the latter also being of a molded synthetic material such as Teflon. In this embodiment, the plate 24 is slidable within the casing 4.

Also slidably mounted in the casing 4 is a propellant grain 26 capable of subliming when heated. In this embodiment, grain 26 is ammonium chloride ($NH_4Cl$). Grain 26 is made by pressing together powdered ammonium chloride, which is commercially available, pressing preferably being done in a vacuum to prevent the entrapment of air and water vapor. In the made and tested embodiment, the propellant grain had a density of 95% of theoretical density.

A porous heating element or plate 28 is mounted in the case, and it is critical that the heating plate 28 has one surface 30 in intimate contact with one surface, or face, 32 of the propellant 26. It is also critical that element 28 be of sufficient porosity to permit the passage of the products of sublimation of the propellant grain 26 to pass therethrough.

In this embodiment, the heater 28 has sufficient resistance to be heated the proper amount by the passage of electrical current therethrough. Heating plate 28 may be made, for example, of powdered carbon. As an example, material obtained from the Speer Graphite Company under their designation HP10 was found satisfactory. In pressed form, such a material has an average density of approximately 0.045 pound per cubic inch; a permeability to nitrogen of approximately 5 feet per minute per foot squared from face to face of a one inch thick block; and a pore volume of approximately 11 cubic inches of air per pound of weight.

For maximum utilization of the propellant grain 26, it is desirable to have the face or surface 32 uniformly heated by the heater 28. To this end, when electrical current is passed through the porous plate 28, the temperature of the surface 30 thereof should be as uniform as possible, and this has been accomplished by shaping member 28 to provide current paths of fairly uniform resistance from one of the leads 36 and 38 attached to member 28, to the other lead.

Figure 4:
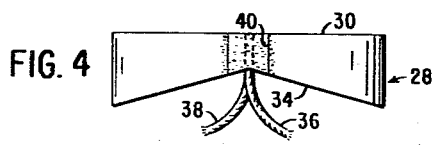
FIG. 4 is a side view of the heating element of FIG. 3.
Figure 3:
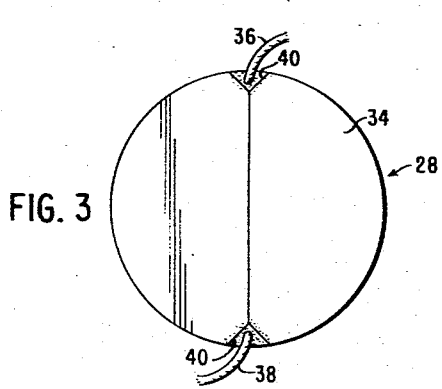
FIG. 3 is a plan view of a heating element used in the FIG. 1 embodiment.

As an example of this construction, and referring to FIGS. 3 and 4, the heater 28 is a cylindrical plate or pellet of the above mentioned porous carbon, having the surface 30 planar to match the shape of the surface 32 of the propellant 26, and the other face or surface of the heater is provided with a reentrant wedge-shaped channel 34. Current conducting leads 36 and 38 are provided at diametrically opposite points on the periphery of the plate 28, as shown. Notches 40 are provided at each end of the line or portion of the plate 28 which defines the apex of the wedge-shaped surface 34, and the leads 36 and 38 are cemented into these notches by an electrically conductive cement. As an example of a cement which has worked satisfactorily, a mixture of epoxy resin and silver powder was used, which material is commercially available. This cement was thinned with acetic acid sufficiently to enable the cement to penetrate somewhat into the pores of the heater in the areas of the notches 40, and sufficient cement was used thoroughly to embed the ends of the leads 36 and 38. The cement is then cured by heating until hard enough to withstand any mechanical motion (within limits) of the lead wires, such as might be encountered in placing the heater 28 in the casing 4.

Figure 2:
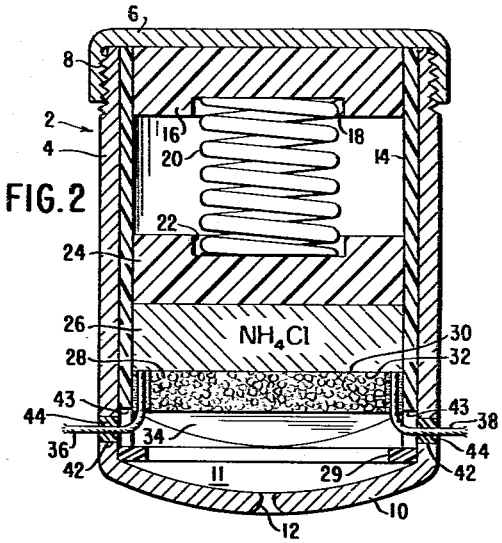
FIG. 2 is a sectional elevation of the FIG. 1 embodiment, taken in the direction of sight lines 2—2 thereon.

As can be seen from FIG. 2, the leads 36 and 38 extend through apertures 42 and 43 in the container 4 and lining 14 respectively, and extend to the outside of the casing for making connection to a source of electrical energy for heating the heater 28. After placing the heater in its proper position in the casing, an electrical insulating cement 44 of conventional nature but one that is capable of withstanding the temperature developed by the heater 28 is used to seal the electrical leads 36 and 38 in the apertures 42 while at the same time insulating the leads from the outer casing.

The heater 28 is supported from the end 10 of the casing by means of a spacer ring or washer 29 which in this instance may be of a ceramic material. The spacer 29, it will be noted, is provided with a relatively larger aperture or hole in order to permit a relatively free flow of the products of sublimation to the orifice 12.

It has been mentioned above that materials other than ammonium chloride can be used as a subliming propellant grain. As examples of such other materials may be mentioned naphthalene, ammonium carbamate, poly (n-butyl methacrylate), ammonium bisulphide, camphor, ammonium carbonate and ammonium bicarbonate. Of course, the temperature to be utilized for the subliming of these other materials will depend on the kind of material that is selected as the propellant, this being within the skill of the art to determine.

The operation of the device is as follows:

When electrical current is passed through the heater 28 via the leads 36 and 38, the heater 28 provides a substantially uniform path therethrough for the passage of current. As a result, a fairly uniform heating of surface 30 occurs, and this in turn heats the surface 32 of the propellant grain 26 to cause it to sublime. The products of sublimation pass downwardly (as drawn) through the heater 28 because of the latter's porosity, and begin to fill the plenum chamber 11. Due to the constriction of the orifice 12, pressure will build up in the plenum 11 until the rate of sublimation and the rate of exit of the sublimation products from the orifice 12 will be a constant. This then, results in a constant pressure in the plenum chamber 11, and thrust so long as heater 28 is kept hot.

One of the features of the above construction is thus to be noted, viz., the heater 28 is mounted stationary in the casing 4, and thus maintains a fixed plenum chamber size. However, in order to maintain the face 32 of the propellant grain 26 in contact with the face 30 of the heater, the spring 20 continues to urge the plate 24 against the propellant 26 during sublimation of the latter, and this in turn urges the propellant material into such contact.

When it is desired to stop the thrust of the propulsion device, the current is cut off, thus allowing the heater 28 to cool with subsequent stoppage of the sublimation and drop in resultant plenum pressure.

A successful working device was made in which the diameter of the casing 4 was approximately 1.165 inches, and its length was approximately 1.65 inches, the above dimensions being the inside dimensions of the casing, that is, inside the liner 14 and from end to end. The propellant grain 26, as indicated above, was ammonium chloride ($NH_4Cl$) having an outside diameter of approximately 1.13 inches and a thickness of approximately 0.265 inch. The orifice 12 was approximately 0.03 inch in diameter.

The heater, as indicated above, was the aforesaid HP10 material, and was approximately 1.12 inches in diameter, about 0.3 inch at its thickest point; and was approximately 0.2 inch thick at its thinnest point, that is, from the surface 30 thereof to the line that constitutes the apex of the re-entrant wedge 34. The resistance of the heater from lead to lead was approximately 0.72 ohm. The plates 16 and 24 were each approximately ¼ inch thick and were of size to permit a slidable fit within the liner 14.

The spring 20 was approximately seven turns of 0.064 diameter spring steel wire, and the spring itself was approximately 0.5 inch in outside diameter. The free length of the spring was approximately 0.6 inch, and, as assembled the spring exerted a force against the propellant grain of six to seven pounds.

In the making of the propellant grain 26 of ammonium chloride, the material was pressed together in air, but preferably for best performance should be pressed together in a vacuum in order to avoid the entrapment of air and other gases.

In the actual reduction to practice, the threaded enclosure end was made the orifice-containing end; that is, the end of the casing on the gas-exit side of the heater plate was screwed on to the casing, instead of having this end an integral part of the casing and the rear end being the one that is screwed on as shown in FIG. 1. The FIG. 1 arrangement is preferred, for ease of assembly, but either arrangement works equally well.

The above device was tested and operated as follows: An operating current of about 2.2 amperes was used through the heater plate, and was controlled so that the heater plate reached 300° F. in approximately ten minutes. The power consumption was 2.4 watts. This temperature was then held fairly constant. (This time can be shortened, of course, by increasing the amount of heating current.) The thrust of the device attained during the operation was approximately $1.7 \times 10^{-6}$ pound.

Figure 5:
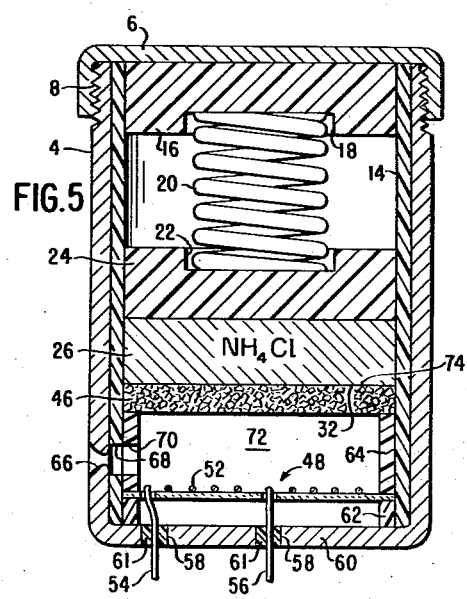
FIG. 5 is an elevation in section of a second embodiment of this invention.
Figure 6:
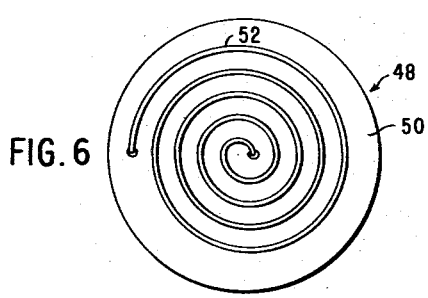
FIG. 6 is a plan view of the heating element used in the FIG. 5 embodiment.

Turning now to FIGS. 5 and 6 for an illustration of a second embodiment of this invention, this embodiment is the same as the FIGS. 1–4 embodiment in all respects except for the means used to heat the surface of the grain 26, the position of the orifice, and the end closure means. That is, a casing 4, cap 6, threads 8, liner 14, plates 16 and 24, spring seat recesses 18 and 22, spring 20, propellant grain 26, and surface 32 of propellant 26, are the same.

In this instance, the heating means is a combination of a porous quartz plate 46 having approximately the same amount of porosity as the heater element 28, and a radiant heater indicated generally by numeral 48. Heater 48 comprises a substratum or plate 50 of suitable insulating material, such as mica or a ceramic, on which is mounted, in conventional manner, a coiled or spiral heating element 52. Attached to the ends of the heating element 52 are the electrically conducting leads 54 and 56. Leads 54 and 56 pass through apertures 58 in the end closure 60 of the casing 4, and are suitably fastened in these apertures by a cement 61 of suitable kind, cement 61 insulating the leads 54 and 56 from a casing 4.

While the heating element 52 has been shown in spiral form, it is obvious that other configurations of the heating element, including making the heating element of a helix of high resistance electrical heater wire which is then mounted in spiral form, are also contemplated.

The heating element 48 is supported in the casing by means of the spacing ring 62, and a second spacing sleeve 64 is provided between the plate 46 and heating element 48 in order to maintain a fixed predetermined distance between these two elements, and also to hold the assembly together in the casing under the influence of the spring 20, with surface 32 of propellant grain 26 in contact with surface 74 of plate 46, that is, in contact with at least a portion of the combined heating means. The liner 14 and sleeve 64 are provided with suitably aligned apertures 68 and 70 to expose the orifice 66 to the plenum chamber 72 for unimpeded flow of the products of sublimation from the plenum chamber through the orifice.

The operation of this embodiment is the same as the operation of the FIGS. 1–4 embodiment, except in this instance the function of the radiant heater 52 is to heat the surface 32 of propellant grain 26 by transmission of radiant energy through the quartz plate 46. The initimate contact of surface 32 with the surface 74 of the plate 46 ensures uniform heating. The products of sublimation are enabled to pass downwardly (as drawn) through the porous plate 46 and into the plenum chamber 72, and thence (after a build up of pressure therein as described for the FIGS. 1–4 embodiment) through the orifice 66 to provide the required thrust. As in the FIGS. 1–4 embodiment, it is the surface 32 of the grain 26 which sublimes, and the function of the spring 20 is to maintain this surface always in contact with the surface 74 of the plate 46.

In view of the above, it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the the above description or shown in the accompanying drawings, shall be interpreted as illustrative and not in a limiting sense, and it is also intended that the appended claims shall cover all such equivalent variations as come within the true spirit and scope of the invention.

Having thus described our invention, what we claim as new and desire to secure by Letters Patent of the United States is:

1. A propulsion device comprising a casing; a solid propellant grain positioned in said casing and movable therein, said grain being capable of subliming when heated; a heating plate extending across said casing and in contact with said grain, means in said casing for urging said grain against said heating plate whereby to heat a face of said grain by said heating plate; said casing having an orifice in a wall thereof for the escape of gas, the orifice being located in the casing on the wall thereof on the other side of the heating plate from said grain; and said heating plate having leads attached to opposite sides thereof for the passage of electrical current therethrough, said heating plate being so configured in cross-section as to be uniformly heated by said electrical current.

2. The propulsion device of claim 1 in which said heating plate has a flat face in contact with said grain, and has a re-entrant wedge-shaped channel in the opposite face thereof extending lengthwise between the places of attachment of said leads, whereby said heating plate is heated uniformly by the passage of electrical current therethrough.

3. The propulsion device of claim 2 in which said heating plate is porous carbonaceous material.

References Cited

UNITED STATES PATENTS

| | | | |
|---|---|---|---|
| 2,671,312 | 3/1954 | Roy | 60—39.48 X |
| 2,816,419 | 12/1957 | Mueller | 60—39.48 X |
| 3,022,190 | 2/1962 | Feldman | 60—200 X |
| 3,115,746 | 12/1963 | Hsia | 60—200 X |
| 3,133,410 | 5/1964 | Gessner | 60—234 X |
| 3,159,967 | 12/1964 | Webb | 60—202 |

CARLTON R. CROYLE, *Primary Examiner.*